Patented Nov. 11, 1941

2,262,689

UNITED STATES PATENT OFFICE 2,262,689

ADHESION-PREVENTING MATERIAL

Edwin L. McDowell and Leonard M. Freeman, Akron, Ohio, assignors to The B. F. Goodrich Company, New York, N. Y., a corporation of New York No Drawing. Application December 4, 1937, Serial No. 178,190

4 Claims. (Cl. 91—68)

This invention relates to adhesion-preventing materials such as powdered mica and talc which are commonly used in the rubber industry to prevent the adhesion of rubber to itself and to other materials.

Adhesion-preventing materials are commonly applied by one of two methods. The dry powder may be dusted on the surface of the rubber, or the powder is mixed with water to make a thin slurry, and slabs of rubber are dipped therein and allowed to dry leaving a film of the powder on the surface thereof. These coatings of fugacious material are easily disturbed by mechanical shocks or slight air currents, thereby spreading the adhesion-preventing material over considerable distances and proving a constant source of contamination. The presence of these materials in the atmosphere also creates a very unhealthy condition since continued inhalation of dust-laden atmosphere may increase susceptibility to lung diseases.

It is the object of this invention, therefore, to provide powdered adhesion-preventing materials which are substantially non-flying without materially increasing the cost of said materials.

We have discovered that by incorporating in the powdered adhesion-preventing material a small amount of a hygroscopic material, the fugacity of these materials is greatly reduced. The hygroscopic material may be a liquid such as glycerine, water glass, or sulfonated petroleum oils. It may also be a salt such as calcium chloride, calcium bromide, zinc chloride, zinc bromide, magnesium chloride, magnesium bromide, sodium carbonate, sodium metaphosphate, sodium thiosulfate, etc.

The amount of hygroscopic material necessary varies with the water-absorbing ability of the material used. As little as .1% of very hygroscopic materials such as calcium chloride or sodium thiosulfate may be sufficient, while as much as 2% or over of less hygroscopic materials such as sodium carbonate may be used.

When we add a liquid hygroscopic material such as glycerine, we prefer to add it in water solution. As an example, a mixture comprising talc 64 parts by weight, glycerine .5 parts, and water 35.5 parts is prepared. Rubber may be dipped directly in this solution. After drying, the talc will have very little tendency to fly. If desired, the talc solution may be filtered, dried, and screened. It may then be dusted onto rubber with none of the disadvantages ordinarily attending such a process.

Solid hygroscopic materials may be finely ground and evenly dispersed throughout the adhesion-preventing material by purely mechanical means such as stirring. As an example, soapstone may be mixed with .2% of finely ground calcium chloride to make a non-flying dusting material.

Although we have herein disclosed specific embodiments of our invention, it will be obvious to one skilled in the art that many modifications such as substituting equivalent materials and varying the proportions of materials used are within the spirit and scope of the invention as defined in the appended claims.

We claim:

1. The method which comprises applying to a rubber surface a thin aqueous slurry of a fine adhesion-preventing powder, said slurry containing a small amount of a substantially non-volatile hygroscopic material, and removing the water, whereby the surface of the rubber is coated with particles of the powder having a substantially reduced fugacity.

2. The method which comprises applying to a rubber surface a thin aqueous slurry of a fine adhesion-preventing powder, said slurry containing a small amount of glycerol, and removing the water, whereby the surface of the rubber is coated with particles of the powder having a substantially reduced fugacity.

3. The method which comprises applying to a rubber surface a thin aqueous slurry of a fine adhesion-preventing powder, said slurry containing a small amount of calcium chloride, and removing the water, whereby the surface of the rubber is coated with particles of the powder having a substantially reduced fugacity.

4. The method which comprises applying to a rubber surface a thin aqueous slurry of soapstone, said slurry containing a small amount of a substantially non-volatile hygroscopic material, and removing the water, whereby the surface of the rubber is coated with particles of soapstone having a substantially reduced fugacity.

EDWIN L. McDOWELL.
LEONARD M. FREEMAN.